United States Patent
Tortora

[19]

[11] Patent Number: 6,050,155
[45] Date of Patent: Apr. 18, 2000

[54] HARMONIC DRIVE FLEXSPLINE WITH INTEGRAL FLANGE SUPPORT

[75] Inventor: Carmine G Tortora, Lowell, Mass.

[73] Assignee: Harmonic Drive Technologies, Peabody, Mass.

[21] Appl. No.: 09/243,928

[22] Filed: Feb. 3, 1999

[51] Int. Cl.[7] .................................................. F16H 37/12
[52] U.S. Cl. ............................................................ 74/640
[58] Field of Search ................................................ 74/640

[56] References Cited

U.S. PATENT DOCUMENTS

| | | | |
|---|---|---|---|
| 2,983,162 | 5/1961 | Musser | 74/640 |
| 4,825,720 | 5/1989 | Capdepuy | 74/640 |
| 5,642,645 | 7/1997 | Foley et al. | 74/640 |

*Primary Examiner*—Sherry L. Estremsky
*Attorney, Agent, or Firm*—Don Halgren

[57] ABSTRACT

A harmonic drive transmission arrangement has an input member and an output member. The transmission comprises a generally cylindrically shaped housing including having a circular spline gear arranged therein, and a cup-shaped flexspline with an array of radially outwardly directed gear teeth on a first end thereof, engaged with the circular spline teeth. A wave generator is rotatably supported on the input member radially inwardly of the gear teeth on the flexspline, and an annular diaphragm is arranged at a second end of the cup-shaped flexspline. A flange is arranged integral to the diaphragm to permit the cup-shaped flexspline to be securely attached to the output member, for the transmission of input through she harmonic drive transmission arrangement, and out the output member through the flange. A "U" shaped channel is annularly arranged between the diaphragm and the flange to distinguish the flange from the diaphragm.

11 Claims, 4 Drawing Sheets

HARMONIC DRIVE FLEXSPLINE WITH INTEGRAL FLANGE SUPPORT

BACKGROUND OF THE INVENTION

1. Field of the Invention

This invention relates to harmonic drive mechanisms, and more particularly to flexspline support arrangements in harmonic drive transmissions.

2. Prior Art

Harmonic drive transmissions were originally called "strain wave gearing" and were initially introduced by Musser in U.S. Pat. No. 2,906,143. Such original harmonic drive transmissions or strain wave gearing comprised a rigid circular spline having "N" teeth, a flexspline having fewer than "N" teeth ("N" being a positive integer) and being disposed within the circular spline, and a rotatable wave generator disposed in the flexspline to deform the flexspline into a lobed configuration, such as an oval shape, so as to force the flexspline into engagement with the circular spline at two points on the major axis of the formed ovaloid.

The wave generator may include an oval cam plate and a bearing snugly mounted on the outer periphery of the cam plate. The outer bearing is matingly inserted into the flexspline so as to deform it to the peripheral contour of the cam plate. An input shaft attached to the cam plate provides rotation thereto, causing the ovaloid configuration of the flexspline to be correspondingly rotated. During such rotation, the circular spline is induced to rotate, relative to the flexspline, in an amount proportional to the difference in the number of teeth between the flexspline and the circular spline. When an output shaft is arranged on either the flexspline or the circular spline, that output shaft is rotated very slowly in comparison to its input shaft. Such harmonic drive, strain wave gearing has been utilized in machinery requiring a high reduction ratio.

The flexsplines are generally cup-shaped, having an open first end and a closed second end. The closed second end usually comprises a diaphragm having a central, generally circular boss thereon. The boss comprises a thickened portion of the diaphragm, as may be seen in U.S. Pat. No. 5,269,202 to Kiyosawa et al. The diaphragm radially outwardly of the boss disclosed in this patent decreases in thickness as it extends radially outwardly from that boss. This flexspline would be bolted to a hub for transmission of rotary motion therebetween. The deflection of the diaphragm as represented by this patent is more towards the mid-portion of that diaphragm, thereby resulting in a less stiff diaphragm than desired, at the teeth of the cup.

It is an object of the present invention to provide a flexspline having improved diaphragm support, to provide improved stiffness at the teeth of the cup.

It is a further object of the present invention to provide a flexspline which overcomes the disadvantages of the prior art.

It is still yet a further object of the present invention to provide a diaphragm which deflects principally at the corner of the cup, and less at a mid-portion of the diaphragm.

It is yet a further object of the present invention to provide a flexspline having a higher load capacity by virtue of its support arrangement.

BRIEF SUMMARY OF THE INVENTION

The present invention comprises a harmonic drive transmission utilized in providing a high ratio of input-to-output rotary motion. The harmonic drive transmission generally comprises a housing of generally cylindrical shape. The housing has a first end and a second end. The first end of the housing has a circular opening thereat, comprising an inwardly directed circular spline toothed gear arrangement. The circular spline has "N" teeth therein. A generally cup-shaped flexspline is rotatably disposed within the housing. The flexspline has a first end which is open, and has a flexible outer lip having an array of radially outwardly directed teeth thereon, of fewer than "N" teeth in number. A power input shaft is rotatably disposed into the first end of the housing, for transmission of rotary motion into the harmonic drive transmission assembly.

A non-circular or generally oval-shaped wave generator, having at least two diametrically opposed lobes along its outer periphery, is disposed radially about the input shaft, and radially inwardly of the flexspline teeth. A bearing assembly is disposed between the outer peripheral surface of the wave generator and the radially inward-most surface of the first end of the flexspline cup.

The flexspline cup has a second end, which is disposed within the second end of the housing. The flexspline cup has a diaphragm extending radially inwardly from its outermost edges at its second end. The diaphragm, at the second end of the flexspline is tapered to an increasing thickness radially inwardly. The radially inward-most end of the tapered diaphragm is uniformly configured as a radially inwardly directed notch or generally "U" shaped channel of annular orientation. The channel has a radially outwardly extending flange defining a second side thereof. The first side of the generally U-shaped notch or channel is defined by the diaphragm which is preferably tapered.

The flange defining the second side of the generally "U" shaped notch or channel has a plurality of bolt holes circularly spaced therearound. The bolt holes are spaced at an enlarged radius (in axial alignment with the diaphragm), to permit the greatest number of bolts to be utilized therewith, for an attachment to an output member, thereby providing greater support between that output member and the flexspline cup. The greater number of holes on that circular array of bolt holes permitted by the flange thus provides support and security greater than that found in the art. The flange itself is defined by two parallel walls, each of which are preferably perpendicular to the axis of rotation of the flexspline cup.

The utilization of a flange which is integral with a tapered diaphragm wall, separated by a generally "U" shaped channel or notch, permits stiffer teeth at the open end of the flexspline cup and better support of the flexspline onto an output shaft. The flange integral with the flexspline cup permits the tooth engagement zone between the circular spline and the flexspline, to be more rigidly supported than that in the prior art, and a higher rotational or torsional stiffness is realized. It also produces a smoother and quieter rotational running of the flexspline by pushing any vibration into higher zones.

Thus, the present invention comprises an improved flexspline cup having an integral flange on its second end, the flange defined by two parallel walls, and the channel defined by a tapered wall of the flexspline diaphragm allowing a length-to-diameter ratio of the flexspline cup smaller than that appreciated by the prior art. Such ratio of the present invention permits the length-to-diameter to be about 0.8:1 or less. This permits such a flexspline to be used in small environments where size is critical.

The invention thus comprises a harmonic drive transmission arrangement having an input member and an output member. The transmission comprises a generally cylindrically shaped housing including having a circular spline gear arranged therein, and a cup-shaped flexspline with an array of radially outwardly directed gear teeth on a first end thereof, engaged with the circular spline teeth. A wave generator is rotatably supported on the input member radially inwardly of the gear teeth on the flexspline. An annular diaphragm is arranged at a second end of the cup-shaped flexspline, and a flange is arranged integral to the diaphragm to permit the cup-shaped flexspline to be securely attached to the output member, for the transmission of input through the harmonic drive transmission arrangement, and out the output member through the flange. A "U"shaped channel is annularly arranged between the diaphragm and the flange. The flange preferably has a diameter generally equivalent to the diameter of the flexspline. A circular array of bolt holes extends through the flange, to permit the flexspline to be secured to the output member. The diaphragm is of tapered thickness, becoming thicker in the radially inward direction. The flange is defined be a pair of spaced apart, annularly extending, parallel walls. The flexspline has an axis or rotation and the parallel spaced apart walls of the flange are generally perpendicular to the axis of rotation of the flexspline. The channel has a radially innermost surface of generally semi-circular shape in cross-section.

The invention also includes a method of securely transmitting a reduced ratio of rotary power from an input member to an output member through a harmonic drive transmission arrangement comprising the steps of: supporting a flexspline within a generally cylindrically shaped housing, the housing including having a circular spline gear arranged therein, and a cup-shaped flexspline with an array of radially outwardly directed gear teeth on a first end thereof, engaged with the circular spline teeth; arranging a wave generator rotatably supported on the input member radially inwardly of the gear teeth on the flexspline; forming an annular diaphragm arranged at a second end of the cup-shaped flexspline; and forming a flange integral to the diaphragm to permit the cup-shaped flexspline to be securely attached to the output member, for the transmission of input through the harmonic drive transmission arrangement, and out the output member through the flange. The method also includes the step of: manufacturing a generally "U" shaped channel between the diaphragm and the flange, so as to permit the channel to have a generally semi-circularly shaped, radially innermost surface thereon.

BRIEF DESCRIPTION OF THE DRAWINGS

The objects and advantages of the present invention will become more apparent when viewed in conjunction with the following drawings in which.

DESCRIPTION OF PREFERRED EMBODIMENTS

Figure 1:
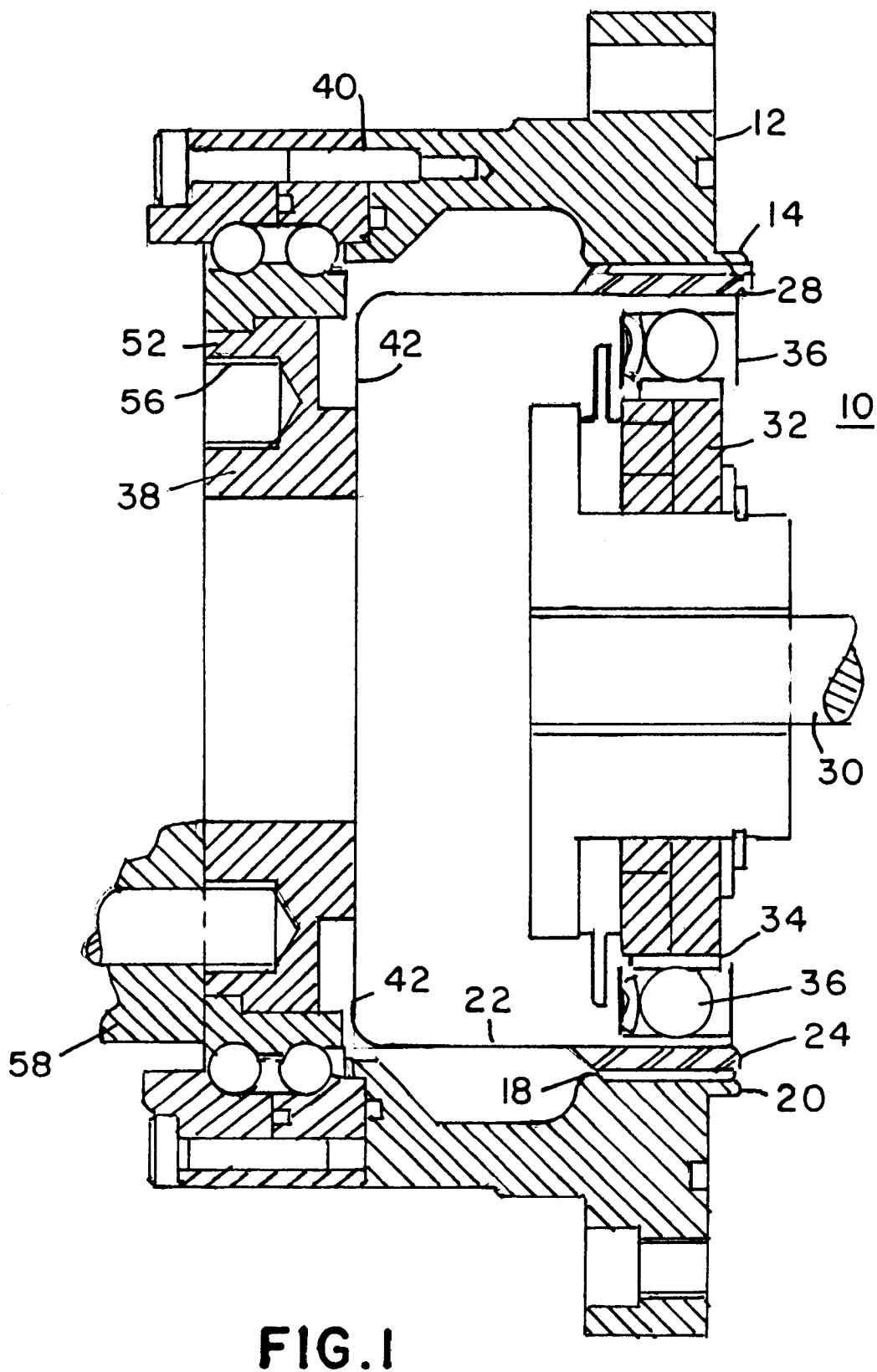
FIG. 1 is a side elevational view of a harmonic drive transmission constructed according to the principles of the present invention.

Referring now to the drawings in detail, and particularly to FIG. 1, there is shown the present invention which comprises a harmonic drive transmission 10 utilized in providing a high ratio of input-to-output rotary motion. The harmonic drive transmission 10 generally comprises a housing 12 of generally cylindrical shape. The housing 12 has a first end 14 and a second end 16. The first end 14 of the housing 12 has a circular opening 18 thereat, having a radially inwardly directed circular spline gear 20 arranged therein. The circular spline gear 20 has "N" teeth therein.

Figure 2:
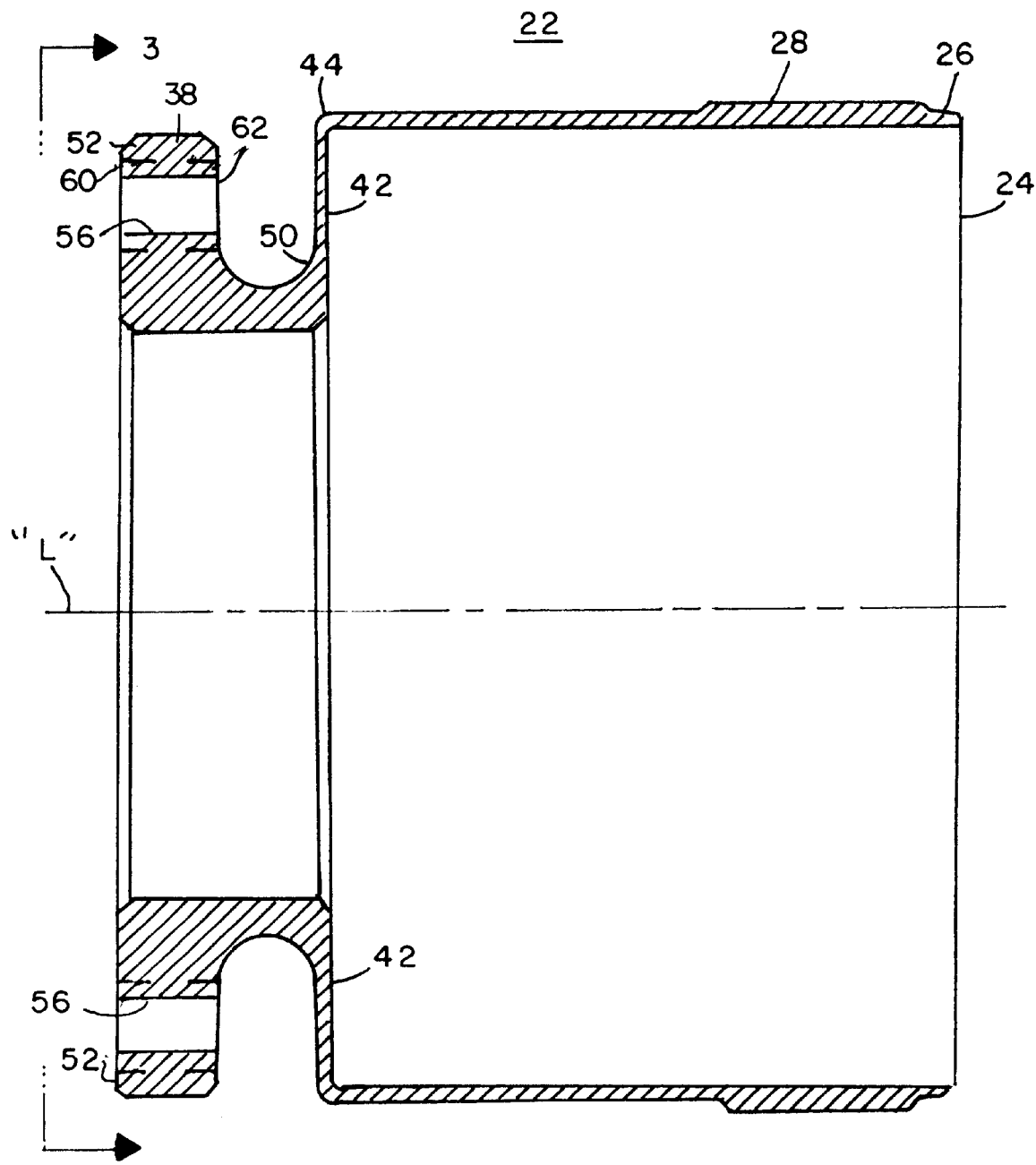
FIG. 2 is a side elevational view of a flexspline cup, a component of the harmonic drive transmission shown in FIG. 1.
Figure 3:
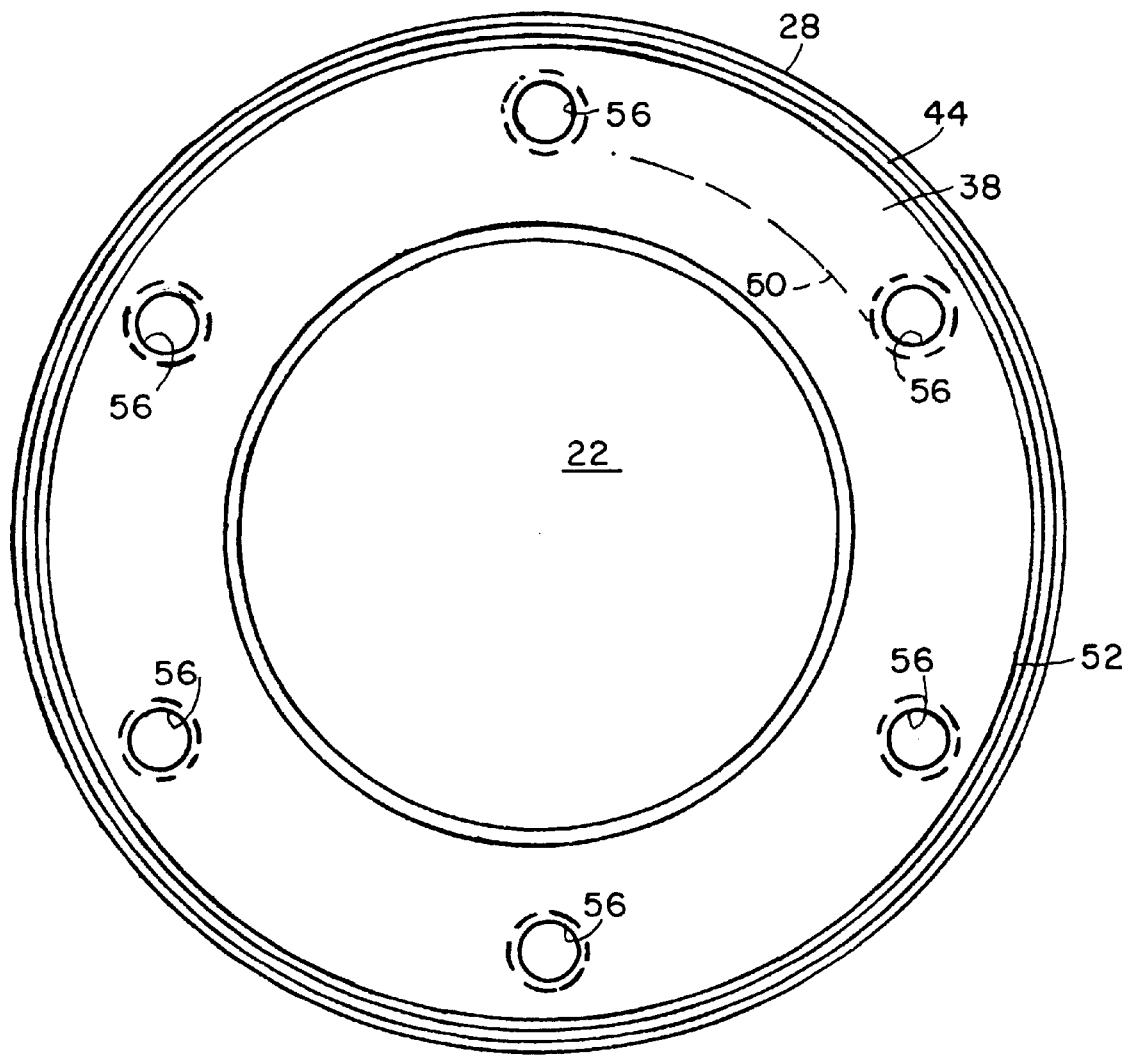
FIG. 3 is a view taken along the lines 3—3 of FIG. 2.

A generally cup-shaped flexspline 22 is rotatably disposed within the housing 12. The flexspline 22 has a first end 24 which is open, and has a flexible outer lip 26 having an array of radially outwardly directed teeth 26 thereon, (of fewer than N teeth in number), as may be seen in FIG. 2. A power input shaft 30, shown in FIG. 1, is rotatably disposed into the first end 14 of the housing 12, for transmission of rotary motion into the harmonic drive transmission assembly 10.

A non-circular or generally oval-shaped wave generator 32, shown in a side view in FIG. 1, has at least two diametrically opposed lobes along its outer periphery 34, is disposed radially about the input shaft 30, and radially inwardly of the flexspline teeth 28. A bearing assembly 36 is disposed between the outer peripheral surface 34 of the wave generator 32 and the radially inward-most surface of the first end 24 of the flexspline cup 22.

Figure 4:
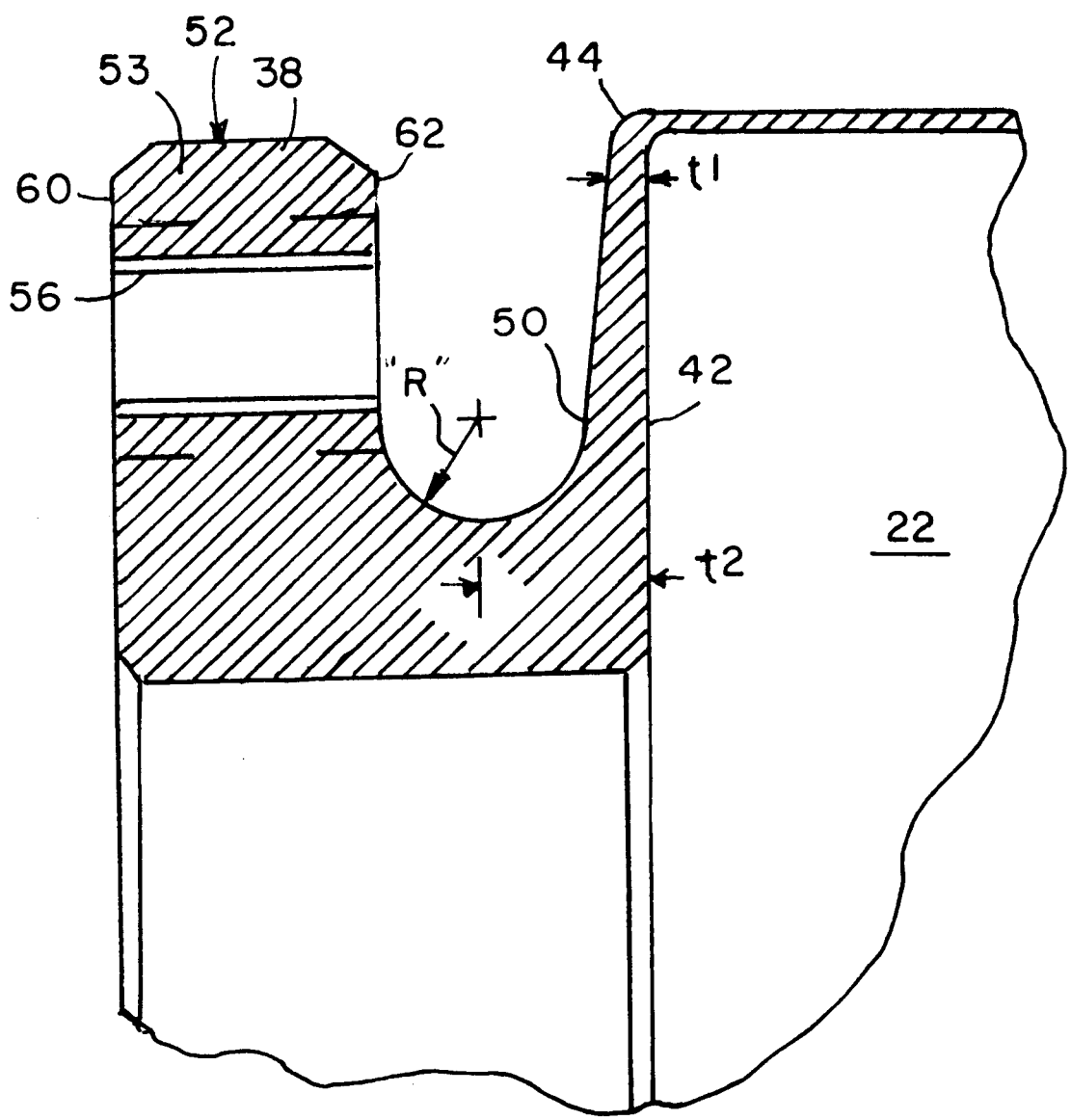
FIG. 4 is an enlarged portion of the flexspline cup and flange shown in FIG. 2.

The flexspline cup 22 has a second end 38, which is disposed within the second end of the housing 12. The flexspline cup 22 has a diaphragm 42 extending radially inwardly from its outermost annular edge 44 at its second end 38, as shown more clearly in FIGS. 2 and 4. The diaphragm 42 at the second end 38 of the flexspline is tapered in cross-section, as best shown in FIG. 4, to an increasing thickness radially inwardly, with a thickness t1 at its radially outermost location being one-half or less than the thickness t2 of the diaphragm from the very radially innermost location of the channel. The radially inward-most end of the tapered diaphragm is uniformly configured as a radially inwardly directed notch or generally "U" shaped channel 50 of annular configuration, and having a radius of curvature "R", as shown in FIG. 4. The channel 50 has a radially outwardly extending flange 52 defining a second side 53 thereof. The first side of the generally U-shaped notch or channel is defined by the tapered diaphragm 42.

The flange 52 defining the second side 53 of the generally "U" shaped notch or channel 50 has a plurality of bolt holes 56 circularly spaced therearound, at a radius of almost the radius of the flexspline cup 22, to permit a greater number of bolts to be utilized therewith, for an attachment to an output member 58, shown in FIG. 1, thereby providing greater support between that output member 58 and the flexspline cup 22. The greater number of holes on that circular array of bolt holes 56 permitted by the flange 52 thus provides support and security greater than that found in the art. The flange 52 itself is defined by two parallel walls 60 and 62, each of which are preferably perpendicular to the axis of rotation "L"of the flexspline cup 22.

The utilization of a flange 52 which is integral with a tapered diaphragm wall 42, separated by a generally "U"shaped channel or notch 50, permits stiffer teeth 28 at the open end 26 of the flexspline cup 22 and better support of the flexspline cup 22 onto an output shaft 58. The flange 52 integral with the flexspline cup 22 permits the tooth engagement zone between the circular spline 20 and the flexspline teeth 28, to be more rigidly supported than that in the prior art, and also having a higher rotational or torsional stiffness is realized. It also produces a smoother and quieter rotational running of the flexspline cup 22 by pushing any vibration into higher zones.

Thus, the present invention comprises an improved flexspline cup having an integral flange on its second end, the flange defined by two parallel walls, and the channel defined by a tapered wall of the flexspline diaphragm allowing a length-to-diameter ratio of the flexspline cup smaller than that appreciated by the prior art. Such ratio of the present invention permits the length-to-diameter of the flexspline cup 22 to be about 0.8 to 1 or less. This permits such a flexspline cup 22 to be used in small environments where size is critical.

What is claimed is:

1. A harmonic drive transmission arrangement having an input member and an output member, said transmission comprising:

a generally cylindrically shaped housing including having a circular spline gear arranged therein, and a cup-shaped flexspline with an array of radially outwardly directed gear teeth on a first end thereof, engaged with said circular spline gear;

a wave generator rotatably supported on said input member radially inwardly of said gear teeth on said flexspline;

an annular diaphragm arranged at a second end of said cup-shaped flexspline;

a flange integral to said diaphragm to permit said cup-shaped flexspline to be securely attached to said output member, for the transmission of input through said harmonic drive transmission arrangement, and out said output member through said flange;

a "U" shaped channel annularly arranged between said diaphragm and said flange said diaphragm being of tapered thickness, becoming thicker in the radially inward direction.

2. The harmonic drive transmission arrangement as recited in claim 1, wherein said flange has a diameter generally equivalent to the diameter of said flexspline.

3. The harmonic drive transmission arrangement as recited in claim 1, including a circular array of bolt holes extending through said flange, to permit said flexspline to be secured to said output member.

4. The harmonic drive transmission arrangement as recited in claim 1, wherein said channel has a radially innermost surface of generally semicircular shape in cross-section.

5. The harmonic drive transmission arrangement as recited in claim 1, wherein said flange is defined by a pair of spaced apart, annularly extending, parallel walls.

6. The harmonic drive transmission arrangement as recited in claim 5, wherein said flexspline has an axis of rotation and said parallel spaced apart walls of said flange are generally perpendicular to said axis of rotation of said flexspline.

7. A method of securely transmitting a reduced ratio of rotary power from an input member to an output member through a harmonic drive transmission arrangement comprising the steps of:

supporting a flexspline within a generally cylindrically shaped housing, said housing including having a circular spline gear arranged therein, and a cup-shaped flexspline with an array of radially outwardly directed gear teeth on a first end thereof, engaged with said circular spline gear;

arranging a wave generator rotatably supported on said input member radially inwardly of said gear teeth on said flexspline;

forming an annular diaphragm arranged at a second end of said cup-shaped flexspline;

forming a flange integral to said diaphragm to permit said cup-shaped flexspline to be securely attached to said output member, for the transmission of input through said harmonic drive transmission arrangement, and out said output member through said flange; and manufacturing a generally "U" shaped channel between said diaphragm and said flange, so as to permit said channel to have a generally semi-circularly shaped, radially innermost surface thereon wherein said diaphragm is defined by a pair of non-parallel walls.

8. The method as recited in claim 7, wherein said flange is defined by a pair of parallel walls.

9. The method as recited in claim 7, wherein said channel has a radially innermost region defined by a generally semi-circular surface in cross-section.

10. The method as recited in claim 1, including the step of:

placing a circular array of bolt holes adjacent the peripheral edge of said flange to permit said output member to be attached thereby.

11. The method as recited in claim 10, including the step of:

aligning said bolt holes in axial alignment with a portion of said diaphragm.

* * * * *